United States Patent
Wang et al.

(10) Patent No.: US 12,450,277 B2
(45) Date of Patent: Oct. 21, 2025

(54) FALSE NEGATIVE PREDICTION FOR TRAINING A MACHINE-LEARNING MODEL

(71) Applicant: Maplebear Inc., San Francisco, CA (US)

(72) Inventors: Xiaochen Wang, State College, PA (US); Taesik Na, Issaquah, WA (US); Xiao Xiao, San Diego, CA (US); Ruhan Zhang, Seattle, WA (US); Xuan Zhang, Palo Alto, CA (US); Tejaswi Tenneti, San Carlos, CA (US); Haixun Wang, Bellevue, WA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/932,301

(22) Filed: Oct. 30, 2024

(65) Prior Publication Data
US 2025/0147997 A1  May 8, 2025

Related U.S. Application Data

(60) Provisional application No. 63/595,648, filed on Nov. 2, 2023.

(51) Int. Cl.
| | |
|---|---|
| *G06F 16/35* | (2025.01) |
| *G06F 16/2457* | (2019.01) |
| *G06F 16/383* | (2019.01) |
| *G06F 16/906* | (2019.01) |
| *G06F 16/9532* | (2019.01) |
| *G06F 16/9535* | (2019.01) |

(52) U.S. Cl.
CPC ........ *G06F 16/35* (2019.01); *G06F 16/24578* (2019.01); *G06F 16/383* (2019.01); *G06F 16/906* (2019.01); *G06F 16/9532* (2019.01); *G06F 16/9535* (2019.01)

(58) Field of Classification Search
CPC .... G06F 16/35; G06F 16/3329; G06F 16/383; G06F 16/24578; G06F 16/2477; G06F 16/248; G06F 16/904; G06F 16/9532; G06F 16/9535; G06F 16/906
USPC .......................................................... 707/736
See application file for complete search history.

(56) References Cited

U.S. PATENT DOCUMENTS

| | | | |
|---|---|---|---|
| 6,411,952 B1 * | 6/2002 | Bharat ................. | G06F 16/951 |
| | | | 707/999.005 |
| 10,170,107 B1 * | 1/2019 | Dreyer ................... | G06F 40/30 |
| 2008/0086432 A1 * | 4/2008 | Schmidtler ........... | G06F 16/353 |
| | | | 706/14 |

(Continued)

*Primary Examiner* — Shahid A Alam
(74) *Attorney, Agent, or Firm* — Fenwick & West LLP

(57) ABSTRACT

An online system updates the labels on negative examples to account for the possibility that the example is a false negative. The system generates a set of initial training examples that each include a query input by the user and item data for an item presented as a result to the user's query. Each training example also includes an initial label, which represents whether the user interacted with the item presented as a search result. The online system updates the initial label for a negative training example by identifying a set of bridge queries and computing a similarity score between the query for the training example and the bridge queries. The online system computes an updated label for the negative example based on the similarity scores and updates the training example with the updated label.

20 Claims, 7 Drawing Sheets

(56) References Cited

U.S. PATENT DOCUMENTS

| | | | |
|---|---|---|---|
| 2008/0097936 A1* | 4/2008 | Schmidtler | G06N 20/10 |
| | | | 706/12 |
| 2013/0246048 A1* | 9/2013 | Nagase | G06F 40/129 |
| | | | 704/9 |
| 2016/0098645 A1* | 4/2016 | Sharma | G06F 16/313 |
| | | | 706/12 |
| 2021/0334314 A1* | 10/2021 | Shmiel | G06F 16/90324 |
| 2023/0306071 A1* | 9/2023 | Magureanu | G06F 16/958 |
| 2024/0127070 A1* | 4/2024 | Gao | G06N 20/20 |

\* cited by examiner

FALSE NEGATIVE PREDICTION FOR TRAINING A MACHINE-LEARNING MODEL

CROSS REFERENCE TO RELATED APPLICATION

This application claims the benefit of U.S. Provisional Application No. 63/595,648, filed Nov. 2, 2023, which is incorporated by reference.

BACKGROUND

Machine-learning models are trained to identify relationships between pieces of data through a training process. The training process involves labeling training data with ground truth labels that indicate the expected output of the models that are trained based on the training data. For example, a machine-learning model that is trained to predict a likelihood of a user interacting with a piece of content presented by an online system may be trained on training examples with labels that represent 0 for an example where a user did not interact with a piece of content and 1 for an example where the user did interact with a piece of content.

However, due to the inefficiency of having humans manually label data, a common problem in the field of training machine-learning models is in generating these labels automatically. For machine-learning models that are to be trained to predict whether an event will occur, the system generating the training data may automatically measure data around when those events occur or do not occur. For example, in the context of selecting content for search results for users, the online system may monitor the search results that it presents to users in response to user queries and label search results with 1 or 0 based on whether the user interacts with each search result. Because the system has direct feedback from the user, this process is effective at generating positive training examples—examples where a search result was a good or appropriate selection for inclusion in a search. However, since many "good" search results may be presented together and only one may be selected, this approach is not as effective at identifying negative training examples. While many systems simply ignore this issue and simply treat all unselected search results as negative, this issue reduces the efficacy of training machine-learning models.

SUMMARY

In accordance with one or more aspects of the disclosure, an online system updates the labels on negative examples to account for the possibility that the example is a false negative. The system generates a set of initial training examples. Each of these training examples represents an instance of when search results were presented to a user in response to a query. For example, a training example may include a query input by the user and item data for an item presented as a result to the user's query. Each training example also includes an initial label, which represents whether the user interacted with the item presented as a search result. As noted above, since users tend to only select one search result out of many presented to the user, this automated process for generating training examples generally creates many negative examples but few positive examples.

However, as noted above, an item may still have been a good search result to present in response to the query even though the user selected another one. For example, if a user provides "apples" as a query, a Granny Smith Apple item is a good selection for a search result even though the user may have selected a Gala Apple item instead. To account for these potential false negatives, the online system updates the initial label for a negative training example by identifying a set of bridge queries. Bridge queries are queries for which the item in the negative training example was selected. For example, using the Granny Smith Apple example, a negative training example may use the query of "apples" and the Granny Smith Apple item as the item in the example. A bridge query for the Granny Smith Apple item would be a query for which that item was actually selected, such as "granny smith apple."

The online system identifies a set of such bridge queries and computes a similarity score between the query for the training example and the bridge queries. For example, the online system may generate an embedding for the query and the bridge queries and may compute a distance between them to compute the similarity scores. The online system computes an updated label for the negative example based on the similarity scores and updates the training example with the updated label. The online system can then use the updated negative examples and the initial positive examples to train a machine-learning model to compute scores to predict a likelihood that a user will select an item if the item is presented as a search result.

By computing these updated labels for negative examples, an online system using these approaches improves on the technical field of machine-learning. Specifically, the online system can avoid false negative training examples degrading the training of a machine-learning model to effectively score content.

DETAILED DESCRIPTION

Figure 1A:
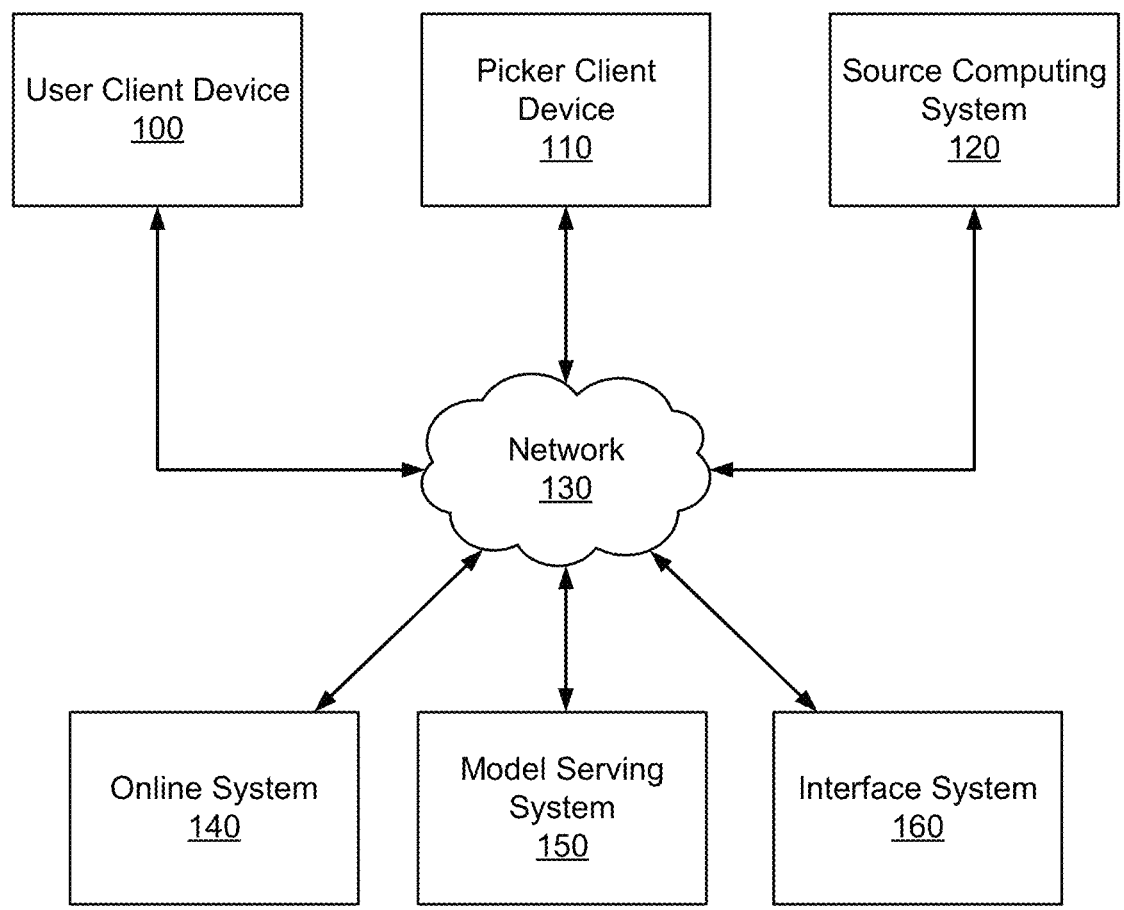
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a user client device 100, a picker client device 110, a source computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1A, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

The model serving system 150 receives requests from the online system 140 to perform tasks using machine-learned models. The tasks include, but are not limited to, natural language processing (NLP) tasks, audio processing tasks, image processing tasks, video processing tasks, and the like. In one embodiment, the machine-learned models deployed by the model serving system 150 are models configured to perform one or more NLP tasks. The NLP tasks include, but are not limited to, text generation, query processing, machine translation, chatbots, and the like. In one embodiment, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one embodiment, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online system 140 or one or more entities different from the online system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one embodiment, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one embodiment, the task for the model serving system 150 is based on knowledge of the online system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one embodiment, the online system 140 is connected to an interface system 160. The interface system 160 receives external data from the online system 140 and builds a structured index over the external data using, for example, another machine-learned language model or heuristics. The interface system 160 receives one or more queries from the online system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 160 and synthesizes a response to the query on the external data. While the online system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
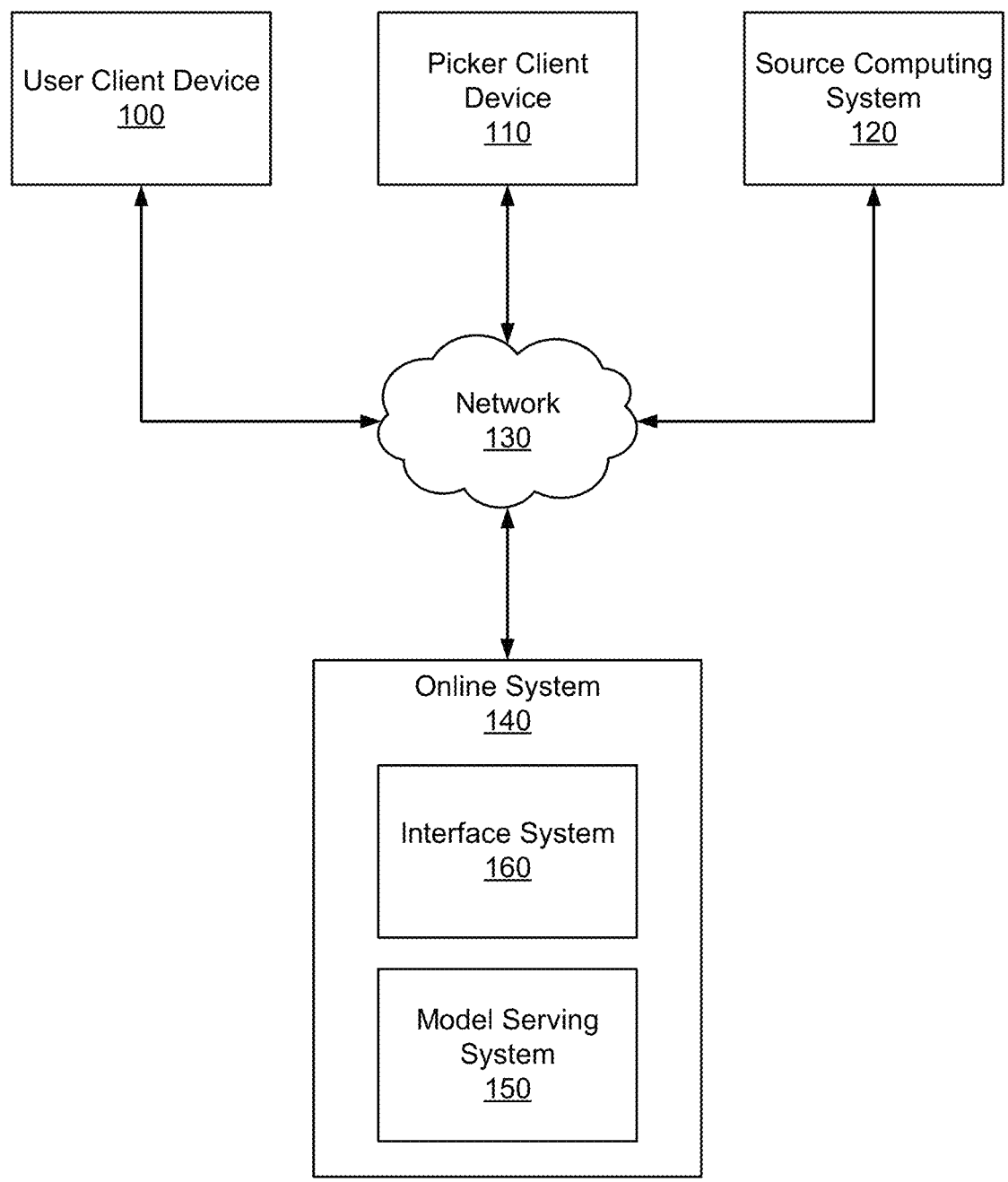
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a user client device 100, a picker client device 110, a source computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 or the interface system 160 is managed by a separate entity from the online system 140. In one embodiment, as illustrated in the example system environment in FIG. 1B, the model serving system 150 or the interface system 160 is managed and deployed by the entity managing the online system 140.

Figure 2:
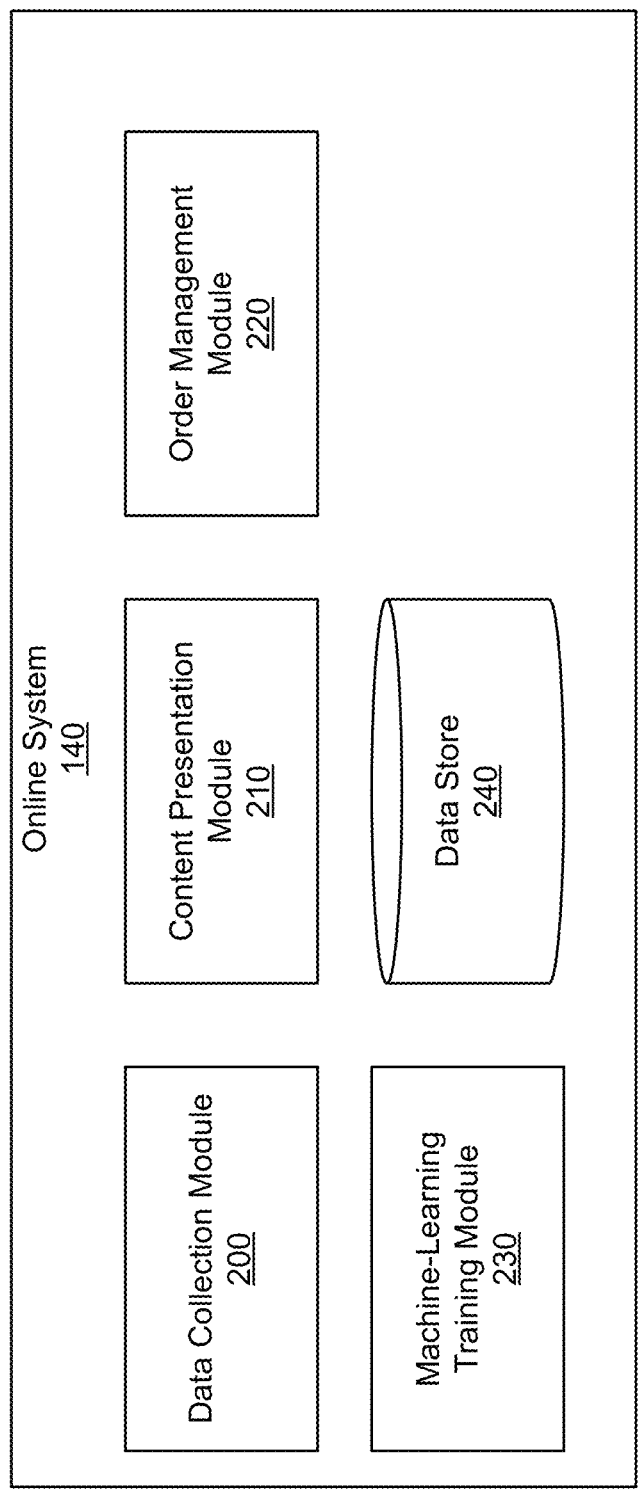
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. For example, the machine learning module 230 may train the item selection model, the availability model, or any of the machine-learned models deployed by the model serving system 150. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

Figure 3:
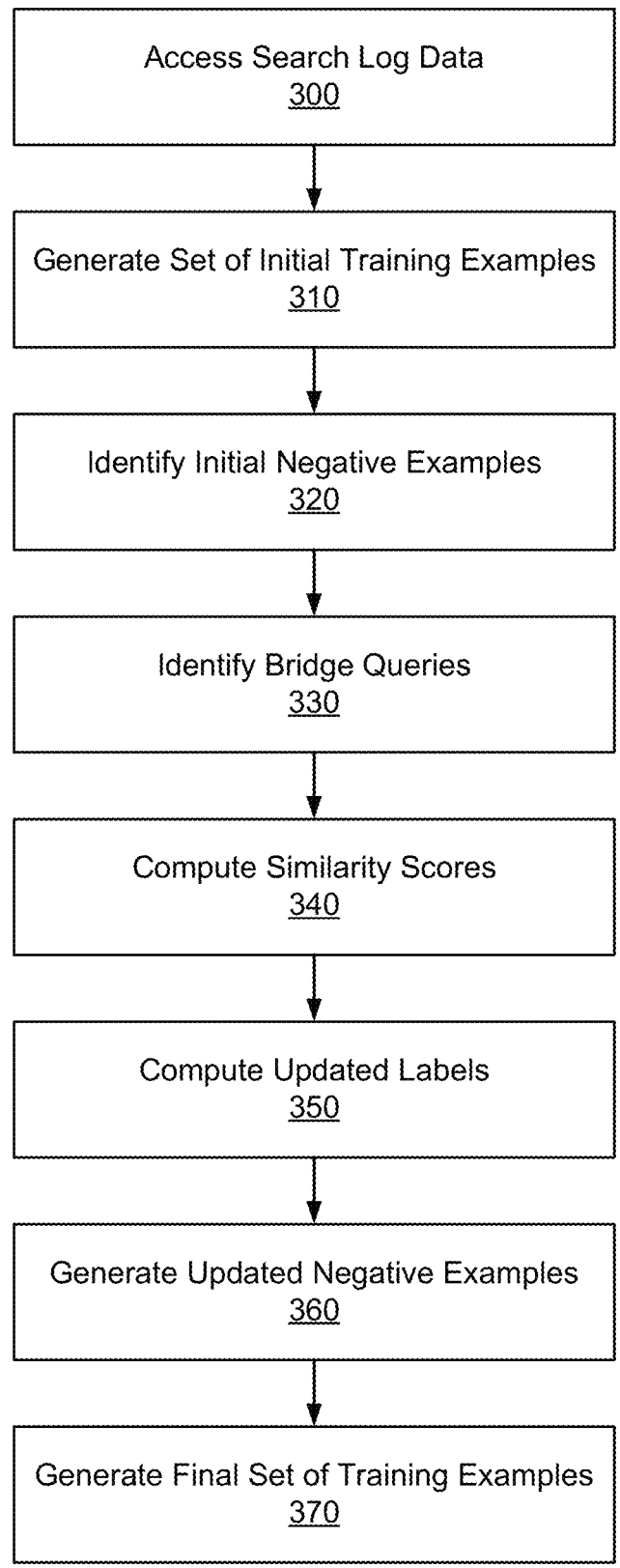
FIG. 3 is a flowchart for a method of generating training data using false negative prediction and labeling, in accordance with some embodiments.

FIG. 3 is a flowchart for a method of generating training data using false negative prediction and labeling, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

An online system accesses 300 search log data describing a set of searches performed by users of the online system. The search log data includes queries placed by users, which is free text describing items of interest to a user. The search log data also includes item data for items that were presented in the search results and may include indications of whether items were selected when presented as search results for a query. For example, the search log data may specify, for each of a set of items, a query for which the item was included as a search result to a user and whether the user selected the item in the search results for that query.

The online system generates 310 a set of initial training examples based on the search log data. Each initial training example corresponds to a query-item pair. Specifically, each initial training example includes a query, item data for an item, and an initial label for the query and item. The initial label indicates whether a positive relationship is demonstrated in the search log data. A positive relationship between an item and a query, as used herein, is where the item is a good or appropriate search result for the query. The initial label may be positive if the user interacted with the item when the item was presented as a search result for the search query. Example interactions that indicate a positive relationship include the user selecting the item for inclusion in an order, the user selecting an option to view more information about an item, or a user adding the item to a list to be viewed later. The initial label may simply be a binary indication (e.g., valued at 0 or 1) of whether a positive relationship is indicated in the search log data. Alternatively, the initial label may have different values based on the type of interaction in the search log data, with different interactions indicating different levels of positive relationships.

An initial label that does not indicate a positive relationship does not necessarily indicate a negative relationship. A negative relationship between an item and a query, as used herein, is where the item is a bad or inappropriate search result for the query. There may be certain circumstances where the initial label does not indicate a positive relationship, but this initial label may be a false negative. For example, if a user submits "apples" as a query, an applesauce item may not have a positive relationship in the search log data with "apples" because no user has selected the applesauce item when it was presented as a search result to "apples." However, that does not mean that applesauce is a bad item to be presented to a user, and at least is not equally bad to an irrelevant item, such as a cookie dough item.

To address these problems with false negatives, the online system updates the negative examples in the set of initial examples. The online system identifies 320 initial negative examples in the set of initial examples. The initial negative examples are the initial examples with initial labels that do not indicate a positive relationship in the search log data.

The online system identifies 330 a set of bridge queries for each of the initial negative examples. A bridge query for an initial negative example is a query that has a positive relationship with the item in the initial negative example. For example, if the initial negative example had a query of "apple" and an applesauce item, a bridge query would be a query in the search log data where the applesauce item was selected, such as "apple sauce" or "apple products."

The online system computes 340 a set of similarity scores for each of the initial negative examples using the identified set of bridge queries for the example. The similarity scores represent a measure of similarity between the query in the initial negative example and a corresponding bridge query. For example, the online system may generate an embedding for each of the queries and compare the embeddings to compute the similarity scores. The online system may apply an embedding model to the bridge queries and the query of the initial negative example to generate the embeddings. For example, the embedding model may be part of a trained bi-encoder model that has already been trained to generate query embeddings and item embeddings for comparison for use in selecting items for possible inclusion in search results.

The online system computes 350 an updated label for the initial negative example based on the computed similarity scores. For example, the online system may compute an average similarity score for the bridge queries corresponding to the initial negative example, and may use that score as the updated label for the initial negative example. The online system generates 360 updated negative examples based on the set of initial negative examples and the computed updated labels for the initial negative examples. In some embodiments, the online system generates the updated negative examples by replacing the initial label for each of the initial negative examples with the computed updated label. In some cases, if the updated label is low enough (e.g., below a threshold) to indicate that the initial negative example is a true negative example, the online system may not generate an updated label for the initial negative example and may instead use the initial label from the example.

In some embodiments, the online system filters the updated examples based on the updated labels. The online system may remove an example if the updated label indicates that the example is likely to be a false negative. For example, the system may score each of the updated negative examples based on their updated labels and may rank them to select which of the examples to use for training a machine-learning model. The online system may select the top n examples to use for training the model. The online system may filter the updated examples instead of or in addition to using updated labels for the initial negative examples.

The online system generates 370 a final set of training examples based on the updated negative examples. The final set of training examples may include the initial training examples with positive initial label as well as the updated negative examples.

The online system uses the final set of training examples to train a machine-learning model to compute item prediction scores. An item prediction score is a score that represents a predicted likelihood that an item has a positive relationship with a query. For example, the item prediction score may represent a likelihood that a user will interact with the item if the item is presented as a search result for the query. The online system may train a machine-learning model to generate item prediction scores by initializing a set of parameters for the model. The online system uses the final set of training examples to update the set of parameters for the model. For example, the online system applies the machine-learning model to the item data and the query of each of the final training examples and compares the resulting item prediction score to the label of the final training example. The online system may use a loss function to compute a loss score that represents the performance of the machine-learning model with regards to its application to a training example. The online system updates the set of parameters based on the loss score using a backpropagation process through the parameters of the machine-learning model. Once the machine-learning model has been trained based on each of the training examples, the online system stores the parameters of the machine-learning model on one or more computer-readable media.

While the method described above is primarily described in the context of queries and items, the principles of the method may be applied more broadly than that context. For example, the method may be used to generate training examples for different kinds of search results, such as searches for web pages or videos. Furthermore, the method is not limited to presenting content in response to queries. For example, rather than items presented in response to queries, the online system may consider videos presented to users. The system may generate similar initial negative examples for user-video pairs and identify bridge users that have interacted with a particular video. The online system may thereby perform a similar process to compute updated labels for the user-video pairs. Accordingly, the described method may be used outside the query-item context.

Furthermore, the search log data may include other information relating to searches. For example, the search log data may include user data describing a user associated with a search. Similarly, the search log data may include context data that describes a context of each search. For example, the context data may describe when the search was placed or other queries that the user has provided during the same session interacting with the online system. This data may be included in the training examples and used by a machine-learning model to compute item prediction scores.

Figure 4A:
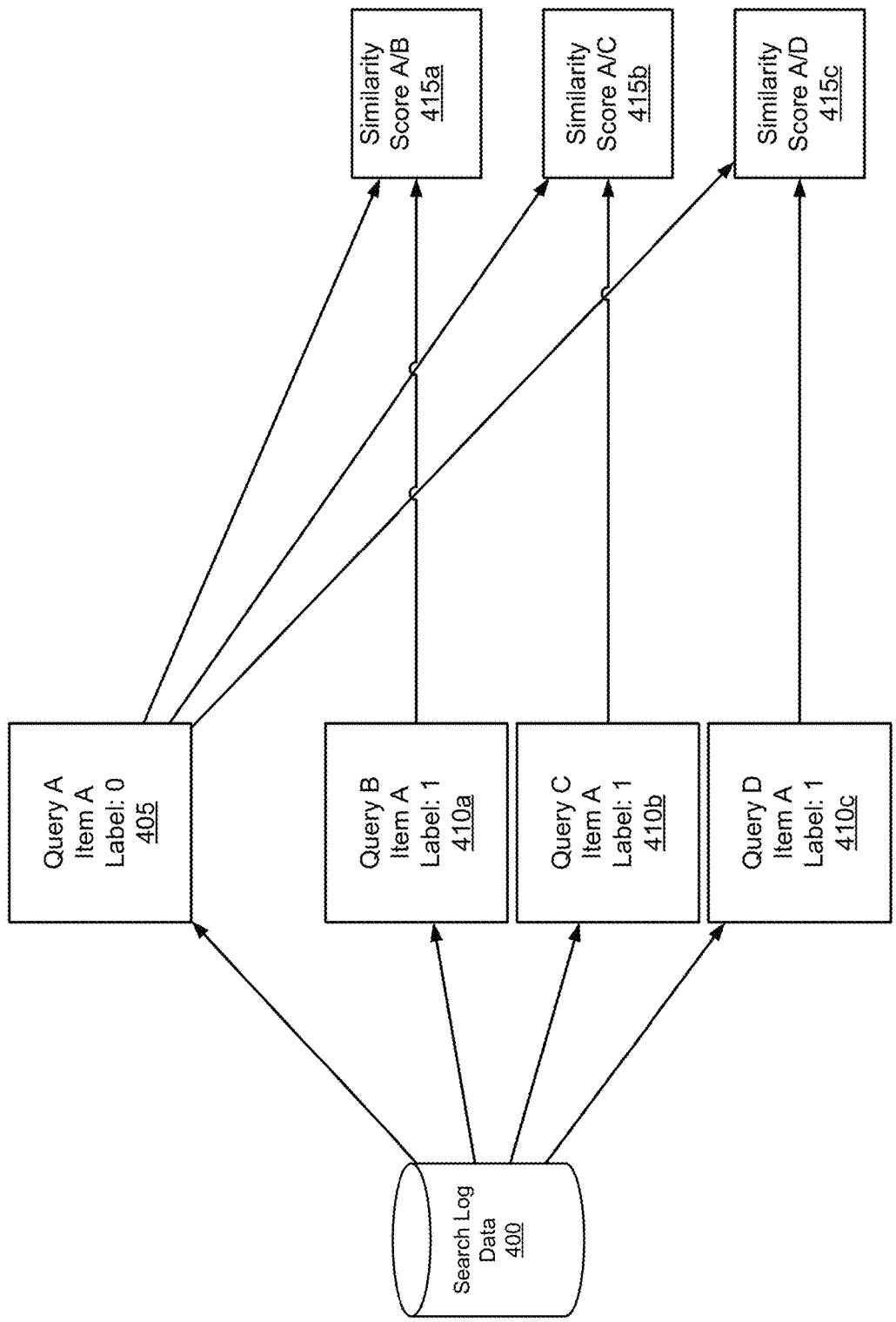
FIG. 4A-4C illustrate an example workflow for generating an updated negative example based on search log data, in accordance with some embodiments.
Figure 4B:
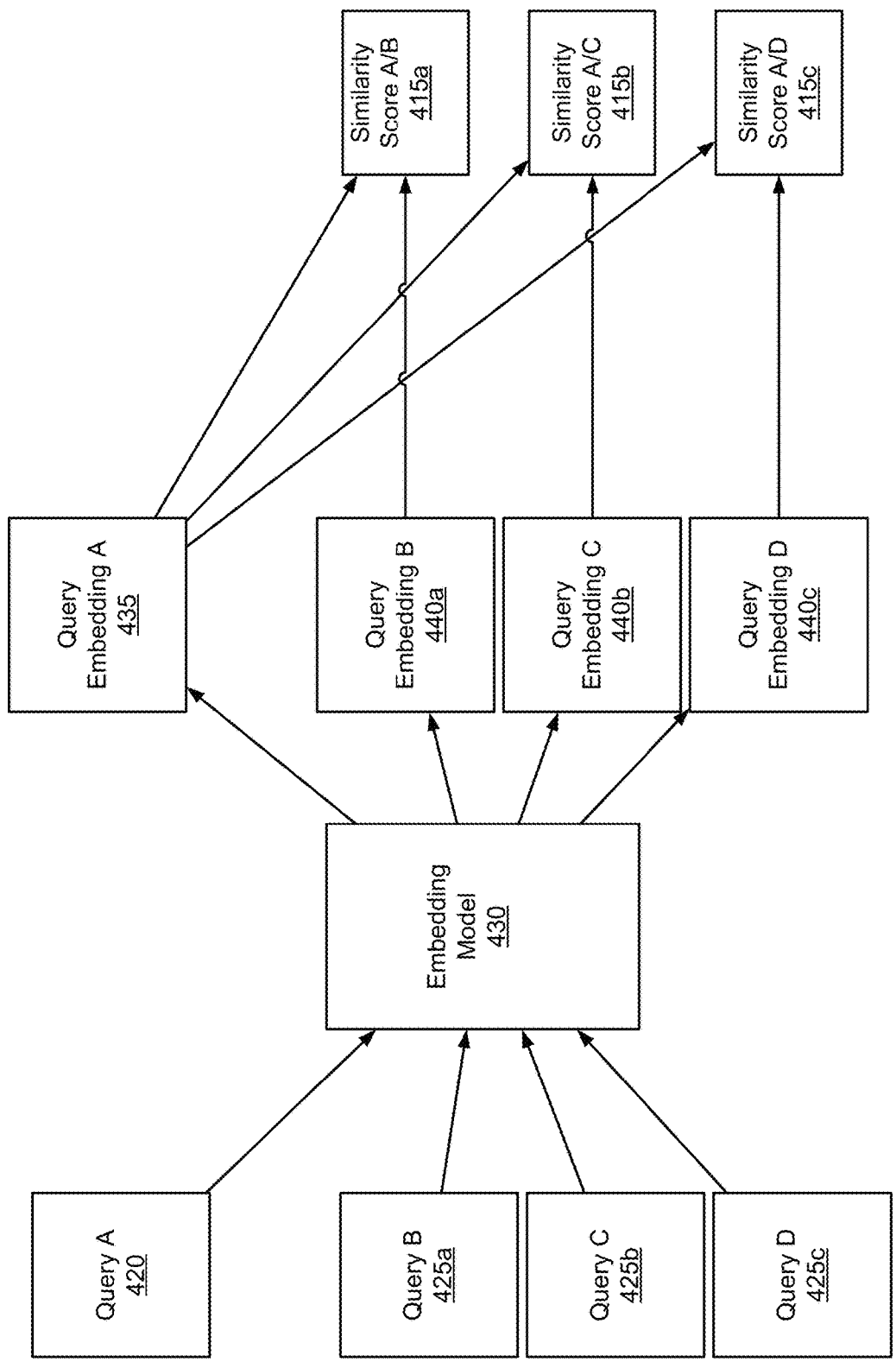
Figure 4C:
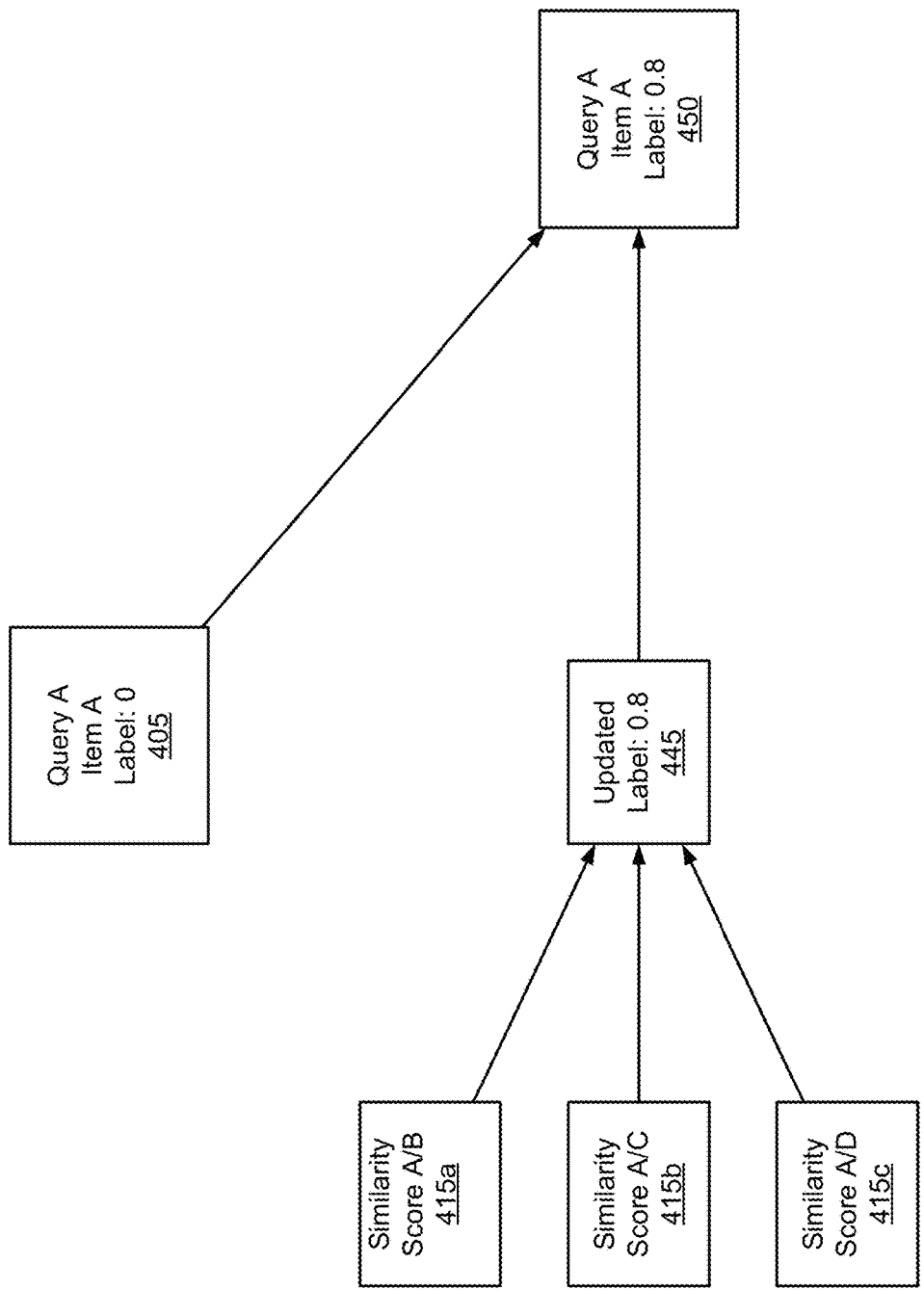

FIG. 4A-4C illustrate an example workflow for generating an updated negative example based on search log data, in accordance with some embodiments. Referring to FIG. 4A, the online system accesses search log data 400 and identifies an initial negative example 405. In FIG. 4A, the initial negative example 405 has Query A as a query, Item A as the item, and an initial label of 0. The online system identifies Queries B-D in the search data as bridge queries for the initial negative example 405. These bridge queries may be part of positive examples 410 that are associated with Item A.

The online system computes similarity scores 415 between Query A and the bridge queries. FIG. 4B illustrates an example process for generating the similarity scores 415. Query A 420 and the bridge queries 425 are passed into an embedding model 430. The embedding model generates a query embedding 435 for Query A and a query embedding 440 for each of the bridge queries 425. The online system computes the similarity scores 415 by computing a similarity (e.g., cosine similarity) between the embedding 435 for Query A and the bridge query embeddings 440.

Referring to FIG. 4C, the online system uses the computed similarity scores 415 to generate an updated label 445 for the initial negative example 405. The online system generates the updated negative example 450 based on the updated label 445 and the initial negative example 405.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A non-transitory computer-readable medium storing a set of parameters for a machine-learning model, wherein the parameters are produced by a process comprising:
   initializing the set of parameters for the machine-learning model;
   accessing search log data captured by an online system, wherein the search log data describes a plurality of queries placed by users of the online system and a plurality of items;
   generating a set of initial training examples based on the search log data, wherein each initial training example comprises a query of the plurality of queries, an item of the plurality of items, and an initial label, wherein the initial label represents whether the item was presented as a search result to a user and was selected by the user;
   identifying a set of initial negative examples by identifying a subset of the set of initial training examples with initial labels below a threshold value;
   updating the set of initial negative examples to generate a set of updated negative examples, wherein the set of updated negative examples is generated by, for each initial negative example:
      identifying a plurality of bridge queries for the query of the initial negative example, wherein the plurality of bridge queries is a subset of the plurality of queries for which the item of the initial negative example was presented as a search result to a user and was selected by the user;
      computing a similarity score between the query of the initial negative example and each of the plurality of bridge queries;
      computing an updated label for the initial negative example based on the computed similarity scores; and
      generating an updated negative example comprising the computed updated label and the query and item of the initial negative example;
   generating a final set of training examples comprising the set of updated negative examples and a subset of the set of initial training examples with initial labels above the threshold value;
   updating the set of parameters by processing each training example in the final set of training examples, wherein updating the set of parameters results in an updated set of parameters for the machine-learning model, and wherein processing each training example in the set of training examples comprises:
      applying the machine-learning model to the item data and the query of the training example to generate an item prediction score, wherein the item prediction score represents a predicted likelihood that a user would select the item when the item is presented as a search result for the query;
      computing a loss score by comparing the item prediction score to a label of the training example; and
      updating the set of parameters for the machine-learning model through a backpropagation process using the computed loss score; and
   storing the updated set of parameters on the computer-readable medium.

2. The computer-readable medium of claim 1, wherein the machine-learning model is a cross encoder model.

3. The computer-readable medium of claim 1, wherein each initial training example of the set of initial training examples comprises user data describing a user corresponding to the query of the initial training example.

4. The computer-readable medium of claim 1, wherein each initial training example of the set of initial training examples comprises context data describing a context of the query of the initial training example.

5. The computer-readable medium of claim 1, wherein computing a similarity score between the query of the initial negative example and a bridge query comprises:
   applying a query embedding model to the query and the bridge query to generate embeddings for the query and bridge query; and
   computing a distance between the embedding for the query and the embedding for the bridge query.

6. The computer-readable medium of claim 5, wherein the embedding model is part of a bi-encoder model that is trained to generate query embeddings and item embeddings for use in selecting items for search results.

7. The computer-readable medium of claim 1, wherein computing an updated label for the initial negative examples comprises:
   computing an average of the computed similarity scores.

8. The computer-readable medium of claim 1, further comprising:
   filtering the set of updated negative examples based on the updated labels.

9. A method, performed by a computing system comprising a processor and a non-transitory computer-readable medium, comprising:
   initializing a set of parameters for a machine-learning model;
   accessing search log data captured by an online system, wherein the search log data describes a plurality of queries placed by users of the online system and a plurality of items;
   generating a set of initial training examples based on the search log data, wherein each initial training example comprises a query of the plurality of queries, an item of the plurality of items, and an initial label, wherein the initial label represents whether the item was presented as a search result to a user and was selected by the user;
   identifying a set of initial negative examples by identifying a subset of the set of initial training examples with initial labels below a threshold value;
   updating the set of initial negative examples to generate a set of updated negative examples, wherein the set of updated negative examples is generated by, for each initial negative example:
      identifying a plurality of bridge queries for the query of the initial negative example, wherein the plurality of bridge queries is a subset of the plurality of queries for which the item of the initial negative example was presented as a search result to a user and was selected by the user;
computing a similarity score between the query of the initial negative example and each of the plurality of bridge queries;
computing an updated label for the initial negative example based on the computed similarity scores; and
generating an updated negative example comprising the computed updated label and the query and item of the initial negative example;
generating a final set of training examples comprising the set of updated negative examples and a subset of the set of initial training examples with initial labels above the threshold value;
updating the set of parameters by processing each training example in the final set of training examples, wherein updating the set of parameters results in an updated set of parameters for the machine-learning model, and wherein processing each training example in the set of training examples comprises:
applying the machine-learning model to the item data and the query of the training example to generate an item prediction score, wherein the item prediction score represents a predicted likelihood that a user would select the item when the item is presented as a search result for the query;
computing a loss score by comparing the item prediction score to a label of the training example; and
updating the set of parameters for the machine-learning model through a backpropagation process using the computed loss score; and
storing the updated set of parameters on the computer-readable medium.

10. The method of claim 9, wherein the machine-learning model is a cross encoder model.

11. The method of claim 9, wherein each initial training example of the set of initial training examples comprises user data describing a user corresponding to the query of the initial training example.

12. The method of claim 9, wherein each initial training example of the set of initial training examples comprises context data describing a context of the query of the initial training example.

13. The method of claim 9, wherein computing a similarity score between the query of the initial negative example and a bridge query comprises:
applying a query embedding model to the query and the bridge query to generate embeddings for the query and bridge query; and
computing a distance between the embedding for the query and the embedding for the bridge query.

14. The method of claim 13, wherein the embedding model is part of a bi-encoder model that is trained to generate query embeddings and item embeddings for use in selecting items for search results.

15. The method of claim 9, wherein computing an updated label for the initial negative examples comprises:
computing an average of the computed similarity scores.

16. The method of claim 9, further comprising:
filtering the set of updated negative examples based on the updated labels.

17. A system comprising:
a processor; and
a non-transitory computer-readable medium storing instructions that, when executed by the processor, cause the processor to perform operations comprising:
initializing a set of parameters for a machine-learning model;
accessing search log data captured by an online system, wherein the search log data describes a plurality of queries placed by users of the online system and a plurality of items;
generating a set of initial training examples based on the search log data, wherein each initial training example comprises a query of the plurality of queries, an item of the plurality of items, and an initial label, wherein the initial label represents whether the item was presented as a search result to a user and was selected by the user;
identifying a set of initial negative examples by identifying a subset of the set of initial training examples with initial labels below a threshold value;
updating the set of initial negative examples to generate a set of updated negative examples, wherein the set of updated negative examples is generated by, for each initial negative example:
identifying a plurality of bridge queries for the query of the initial negative example, wherein the plurality of bridge queries is a subset of the plurality of queries for which the item of the initial negative example was presented as a search result to a user and was selected by the user;
computing a similarity score between the query of the initial negative example and each of the plurality of bridge queries;
computing an updated label for the initial negative example based on the computed similarity scores; and
generating an updated negative example comprising the computed updated label and the query and item of the initial negative example;
generating a final set of training examples comprising the set of updated negative examples and a subset of the set of initial training examples with initial labels above the threshold value;
updating the set of parameters by processing each training example in the final set of training examples, wherein updating the set of parameters results in an updated set of parameters for the machine-learning model, and wherein processing each training example in the set of training examples comprises:
applying the machine-learning model to the item data and the query of the training example to generate an item prediction score, wherein the item prediction score represents a predicted likelihood that a user would select the item when the item is presented as a search result for the query;
computing a loss score by comparing the item prediction score to a label of the training example; and
updating the set of parameters for the machine-learning model through a backpropagation process using the computed loss score; and
storing the updated set of parameters on the computer-readable medium.

18. The system of claim 17, wherein each initial training example of the set of initial training examples comprises user data describing a user corresponding to the query of the initial training example.

19. The system of claim 17, wherein each initial training example of the set of initial training examples comprises context data describing a context of the query of the initial training example.

20. The system of claim 17, wherein computing a similarity score between the query of the initial negative example and a bridge query comprises:
   applying a query embedding model to the query and the bridge query to generate embeddings for the query and bridge query; and
   computing a distance between the embedding for the query and the embedding for the bridge query.

* * * * *